(12) United States Patent
Kania et al.

(10) Patent No.: US 8,443,749 B2
(45) Date of Patent: May 21, 2013

(54) FLOATING ISLAND MODULE COMPRISED OF POST-CONSUMER CARPET FIBER MATRIX AND METHOD OF MANUFACTURING SAME

(75) Inventors: Bruce G. Kania, Shepherd, MT (US); Frank M. Stewart, Bozeman, MT (US); Jeffrey Hanson, St. Paul, MN (US)

(73) Assignee: Fountainhead, L.L.C., Shepherd, MT (US)

( * ) Notice: Subject to any disclaimer, the term of this patent is extended or adjusted under 35 U.S.C. 154(b) by 202 days.

(21) Appl. No.: 12/948,726

(22) Filed: Nov. 17, 2010

(65) Prior Publication Data

US 2012/0118214 A1    May 17, 2012

(51) Int. Cl.
*B63B 35/44*    (2006.01)
(52) U.S. Cl.
USPC .......................................... 114/264; 264/112
(58) Field of Classification Search
USPC ............ 114/264; 264/112; 428/138; 47/59 R, 47/85
See application file for complete search history.

(56) References Cited

U.S. PATENT DOCUMENTS

| | | | | |
|---|---|---|---|---|
| 2,175,113 | A | * | 10/1939 | Fischer .......................... 47/59 R |
| 4,614,679 | A | * | 9/1986 | Farrington et al. ........... 428/138 |
| 4,888,912 | A | | 12/1989 | Murray |
| 5,404,671 | A | | 4/1995 | Farrow, Jr. et al. |
| 6,014,838 | A | | 1/2000 | Asher |
| 6,086,755 | A | | 7/2000 | Tepper |
| 6,751,903 | B2 | | 6/2004 | Shryock |
| 6,918,206 | B2 | | 7/2005 | Schuck |
| 7,087,161 | B1 | | 8/2006 | Nishibori et al. |
| 7,448,163 | B2 | | 11/2008 | Beeman et al. |
| 2003/0049392 | A1 | | 3/2003 | Shryock |
| 2005/0044788 | A1 | | 3/2005 | Tang et al. |

* cited by examiner

*Primary Examiner* — Lars A Olson
(74) *Attorney, Agent, or Firm* — Antoinette M. Tease (57) ABSTRACT

A floating island comprising one or more modules each comprised of one or more layers of permeable and porous matrix comprised of post-consumer carpet fibers and a top covering and a bottom covering around each layer. Alternate embodiments include layers comprised of polyethylene terephthalate bottle-fiber matrix and/or jute or coir fibers. A method of manufacturing the floating island module described above.

16 Claims, 7 Drawing Sheets

FLOATING ISLAND MODULE COMPRISED OF POST-CONSUMER CARPET FIBER MATRIX AND METHOD OF MANUFACTURING SAME

BACKGROUND OF THE INVENTION

1. Field of the Invention

The present invention relates generally to the field of floating islands, and more specifically, to floating island modules comprised of post-consumer carpet fiber matrix.

2. Description of the Related Art

Manmade floating islands are useful for a wide range of applications including wastewater treatment, wildlife habitat, and waterscape beautification. Porous and permeable floating islands that biomimic natural floating islands are particularly useful because they can provide a combination of benefits, which include providing an internal growth substrate for natural water-purifying microbes, habitat for insects having value as fish food, nesting cover for fish and birds, growth areas for the roots of hydroponic plants, and environmentally-friendly wave attenuation and shoreline protection.

Floating Island International, LLC (FII) of Shepherd, Mont. has developed an extensive range of intellectual property and commercial products related to floating islands that utilize the concepts of porosity, permeability, large internal surface areas for microbial colonization, and internal buoyancy. A key component of many of these products is a mat of nonwoven polymer fibers that forms the body of the floating islands and promotes plant root growth and/or microbial biofilm colonization. Several forms of fiber matting have been used successfully for various floating island products. Prior-art examples of different types of polymer fiber matting include compressed fibers contained in a permeable net bag, compressed fibers bonded together with a binder to form a matrix material, and a hollow fiber-matrix box filled with compressed unbonded fibers.

U.S. patent application Ser. No. 11/569,491 (Kania et al.) describes the use of one or more layers of water-permeable mesh material comprising polyester fibers as a substrate for beneficial microbes and plant roots, which acts as a biological filter to remove water-borne contaminants, including excess nutrients. Various means of buoyancy, including buoyant nodules and injected, expandable foam, are also described.

U.S. Pat. No. 7,555,866 (Kania et al.) describes a floating island specialized for waterfowl nesting and comprising scrap pieces or layers of polyester mesh material.

New Zealand Patent No. NZ 581425 (Kania et al.) describes a floating streambed comprising permeable matrix, wherein the permeable matrix may be comprised of nonwoven polymer fibers, nonwoven polymer fibers comprised of polyester, or nonwoven polymer fibers comprised of recycled scrap carpet fibers. The fibers are intertwined to form a blanket approximately 1¾ inch thick, and a latex binder is sprayed onto the blanket and cured by baking. Multiple layers of matrix are stacked and attached to form blocks of any desired thickness. Buoyancy is achieved by injecting uncured polyurethane resin that expands in place within the matrix during the curing process.

International Patent Application No. PCT/US09/037,745 (Kania et al.) describes the use of "fiber wool" as an internal filler material for floating island modules, wherein the fiber wool may be composed of either natural or synthetic materials or a combination of both. Specifically mentioned synthetic materials include polyester, polypropylene, and polyethylene. Injected expandable foam is used as a means of buoyancy.

All of the embodiments described above have disadvantages that are overcome by the present invention. In the embodiments that utilize nonwoven polyester matrix, the cost of the matrix is relatively high. In the embodiments that describe the use of fiber wool, the fiber wool filler material has a much lower cost than the nonwoven matrix but has much less tensile strength and structural integrity than nonwoven matrix. In the embodiments that describe injected foam or inserted floats, the buoyant nodules produce localized zones within the interior of the floating islands that have reduced permeability, resulting in a structure having non-homogeneous permeability and buoyancy characteristics that may adversely affect water circulation to the beneficial microbes colonizing the interior regions of the matrix.

The present invention is a floating island module comprised of nonwoven polymer matrix comprised of recycled carpet fibers that are bonded together during manufacture with small droplets of optionally buoyant adhesive and encapsulated within permeable protective covers. The present invention results in a matrix-based module that retains the beneficial characteristics of the prior-art nonwoven polymer matrix modules related to permeability, porosity, and acceptable tensile strength, while significantly reducing the unit cost of materials and simultaneously providing the desired amount of buoyancy and eliminating the low-permeability zones of the injected foam of the prior art modules.

The present invention is particularly desirable for environmental remediation applications such as marine oil-spill cleanup, wherein the combination of fine, oil-attractive fibers and low cost provide an effective and disposable product.

BRIEF SUMMARY OF THE INVENTION

The present invention is a floating island comprising one or more modules each comprised of one or more layers of permeable and porous matrix comprised of post-consumer carpet fibers. In a preferred embodiment, the invention further comprises a top covering and a bottom covering around each layer, wherein the top covering and bottom covering are each comprised of materials that are resistant to abrasion and ultraviolet light and permeable to water and gasses. In a preferred embodiment, the top covering and bottom covering are each penetrable by plant roots and stems. In another preferred embodiment, the top covering and bottom covering are comprised of open-weave polypropylene carpet backing fabric. In an alternate embodiment, the top covering and bottom covering are comprised of nonwoven polymer geotextile fabric.

In a preferred embodiment, the invention further comprises bonding particles that attach the post-consumer carpet fibers together. In a preferred embodiment, the invention further comprises bonding particles that attach the post-consumer carpet fibers to the top covering and the bottom covering. In one embodiment, the bonding particles are comprised of closed-cell polymer foam. In another embodiment, the post-consumer carpet fibers form pore spaces in the matrix, and wherein the bonding particles occupy some of the pore spaces within the matrix.

In yet another embodiment, the invention further comprises internal rope or webbing that is incorporated into each layer of matrix during the manufacturing process. In an alternate embodiment, the invention further comprises perimeter rope or webbing that is installed around each layer of matrix.

In a preferred embodiment, each module has a perimeter, and the top covering and bottom covering are fusion welded together around all or a portion of the perimeter of each layer. In another preferred embodiment, the top covering and the bottom covering each has an outer edge, and one or more end caps are placed over the outer edges of the top covering and bottom covering and fusion welded to the top covering and bottom covering.

In a preferred embodiment, the layers of post-consumer carpet fiber matrix are vertically stacked and attached to each other. In one embodiment, the layers of post-consumer carpet fiber matrix are vertically stacked and attached to each other with polyurethane foam adhesive. In another embodiment, the layers of post-consumer carpet fiber matrix are vertically stacked and attached to each other with layer attachments loops that are punched through the layers.

In a preferred embodiment, the bonding particles are comprised of non-foaming resin droplets. In an alternate embodiment, the bonding particles are comprised of molten droplets of thermoplastic polymer resin.

In yet another embodiment, the invention is a floating island comprising one or more modules each comprised of one or more layers of permeable and porous matrix comprised of jute or coir fibers. The invention preferably further comprises a top covering and a bottom covering around each layer.

In yet another embodiment, the invention is a floating island comprising one or more modules each comprised of one or more layers of permeable and porous matrix comprised of post-consumer carpet-fiber matrix and one or more layers of polyethylene terephthalate bottle-fiber matrix. In another embodiment, the invention is a floating structure comprising one or more modules installed vertically into a water body to form a vertical curtain, and each module is comprised of one or more layers of permeable and porous matrix comprised of post-consumer carpet fibers. The modules are preferably arranged in rows, with one row of modules on top of another, wherein one of the rows of modules is positively-buoyant and another row of modules is negatively-buoyant.

The invention is also a method of manufacturing a floating island comprising one or more modules each comprised of one or more layers of permeable and porous matrix, comprising the steps of: providing an upper scrim roll that supplies top-cover scrim to form a top covering; providing a lower scrim roll that supplies bottom-cover scrim to form a bottom covering; blowing loose post-consumer carpet fibers between the top-cover scrim and the bottom-cover scrim via a fiber feeder; spraying uncured two-part polyurethane foam resin droplets onto the loose post-consumer carpet fibers as they are blown between the top-cover scrim and the bottom-cover scrim; compressing the loose post-consumer carpet fibers to a desired packing density as they travel along a compression table to form a post-consumer carpet matrix; passing the post-consumer carpet matrix between an upper vacuum draw and a lower vacuum draw, wherein the upper vacuum draws a first portion of the two-part polyurethane foam resin droplets toward and against an inside surface of the top-cover scrim, and the lower vacuum draw pulls a second portion of the two-part polyurethane foam resin droplets toward and against an inside surface of the bottom-cover scrim, thereby bonding the post-consumer carpet matrix to the top and bottom coverings; and cutting the post-consumer carpet matrix into desired lengths with a mechanical cutter to form a layer of post-consumer carpet matrix.

Preferably, each layer of post-consumer carpet matrix has two side edges, and the invention further comprises the step of sealing the side edges by wrapping the bottom covering over the top covering to create an overlapping seam and fusion welding the overlapping seam. Alternately, each layer of post-consumer carpet matrix has two side edges, and the invention further comprises the step of sealing the side edges by wrapping the top covering over the bottom covering to create an overlapping seam and fusion welding the overlapping seam.

In a preferred embodiment, each layer of post-consumer carpet matrix has a front edge and a rear edge, and the invention further comprises the step of sealing the front and rear edges by placing an end cap over the front edge and rear edge and fusion welding the end carp to the matrix. Preferably, the end caps are comprised of the same material as the top and bottom covering.

In a preferred embodiment, the invention further comprises the step of punching slits or holes through the layer of post-consumer carpet matrix to increase permeability of the matrix and/or to provide planting pockets for seeds and bedding plants. In one embodiment, the two-part polyurethane foam resin droplets are replaced with two-part polyurethane or polyurea non-foaming resin droplets that cure in place to bond the post-consumer carpet fibers without producing foam. In another embodiment, the two-part polyurethane foam resin droplets are replaced with molten droplets of thermoplastic polymer resin that cure in place to bond the post-consumer carpet fibers without producing foam.

The invention is also a method of manufacturing a floating island comprising one or more modules each comprised of one or more layers of permeable and porous matrix, comprising the steps of: providing an upper scrim roll that supplies top-cover scrim to form a top covering; providing a lower scrim roll that supplies bottom-cover scrim to form a bottom covering; blowing loose post-consumer carpet fibers between the top-cover scrim and the bottom-cover scrim via a fiber feeder; placing an internal rope, webbing or cable between the top-cover scrim and the bottom-cover scrim as the loose post-consumer carpet fibers are blown between the top-cover scrim and the bottom-cover scrim; compressing the loose post-consumer carpet fibers to a desired packing density as they travel along a compression table to form a post-consumer carpet matrix; and cutting the post-consumer carpet matrix into desired lengths with a mechanical cutter to form a layer of post-consumer carpet matrix.

The invention is also a method of manufacturing a floating island comprising one or more modules each comprised of one or more layers of permeable and porous matrix, comprising the steps of: providing an upper scrim roll that supplies top-cover scrim to form a top covering; providing a lower scrim roll that supplies bottom-cover scrim to form a bottom covering; blowing loose post-consumer carpet fibers between the top-cover scrim and the bottom-cover scrim via a fiber feeder; compressing the loose post-consumer carpet fibers to a desired packing density as they travel along a compression table to form a post-consumer carpet matrix; cutting the post-consumer carpet matrix into desired lengths with a mechanical cutter to form a layer of post-consumer carpet matrix; and wherein each layer of post-consumer carpet matrix has a perimeter, securing rope, webbing or cable around all or a portion of the perimeter of each layer.

The invention is also a method of manufacturing a floating island comprising one or more modules each comprised of one or more layers of permeable and porous matrix, comprising the steps of: providing an upper scrim roll that supplies top-cover scrim to form a top covering; providing a lower scrim roll that supplies bottom-cover scrim to form a bottom covering; blowing loose jute fibers between the top-cover scrim and the bottom-cover scrim via a fiber feeder; spraying uncured two-part polyurethane foam resin droplets onto the loose jute fibers as they are blown between the top-cover scrim and the bottom-cover scrim; compressing the loose jute fibers to a desired packing density as they travel along a compression table to form a jute matrix; passing the jute matrix between an upper vacuum draw and a lower vacuum draw, wherein the upper vacuum draws a first portion of the two-part polyurethane foam resin droplets toward and against an inside surface of the top-cover scrim, and the lower vacuum draw pulls a second portion of the two-part polyurethane foam resin droplets toward and against an inside surface of the bottom-cover scrim, thereby bonding the jute matrix to the top and bottom coverings; and cutting the jute matrix into desired lengths with a mechanical cutter to form a layer of post-consumer carpet matrix.

The invention is also a method of manufacturing a floating island comprising one or more modules each comprised of one or more layers of permeable and porous matrix, comprising the steps of: providing an upper scrim roll that supplies top-cover scrim to form a top covering; providing a lower scrim roll that supplies bottom-cover scrim to form a bottom covering; blowing loose coir fibers between the top-cover scrim and the bottom-cover scrim via a fiber feeder; spraying uncured two-part polyurethane foam resin droplets onto the loose coir fibers as they are blown between the top-cover scrim and the bottom-cover scrim; compressing the loose coir fibers to a desired packing density as they travel along a compression table to form a coir matrix; passing the coir matrix between an upper vacuum draw and a lower vacuum draw, wherein the upper vacuum draws a first portion of the two-part polyurethane foam resin droplets toward and against an inside surface of the top-cover scrim, and the lower vacuum draw pulls a second portion of the two-part polyurethane foam resin droplets toward and against an inside surface of the bottom-cover scrim, thereby bonding the jute matrix to the top and bottom coverings; and cutting the coir matrix into desired lengths with a mechanical cutter to form a layer of post-consumer carpet matrix.

The invention is also a method of manufacturing a floating island comprising the steps of: applying a top covering and a bottom covering made of a scrim material to a pre-made jute blanket; and attaching the top and bottom covering to the blanket by spraying an uncured adhesive onto an outside surface of the blanket and then immediately applying the covering over the blanket so that the adhesive contacts both an outside blanket surface and the outside covering surface, penetrates into both the blanket and covering material, and cures in place, thereby adhering the blanket and covering together.

The invention is also a method of manufacturing a floating island comprising the steps of: applying a top covering and a bottom covering made of a scrim material to a pre-made coir blanket; and attaching the top and bottom covering to the blanket by spraying an uncured adhesive onto an outside surface of the blanket and then immediately applying the covering over the blanket so that the adhesive contacts both an outside blanket surface and the outside covering surface, penetrates into both the blanket and covering material, and cures in place, thereby adhering the blanket and covering together.

In a preferred embodiment, the adhesive is selected from the group consisting of a two-part polyurethane, a polyurethane foam, a thermoplastic foam, and a thermoplastic resin foam.

REFERENCE NUMBERS

1 Floating island
2 Module
3 Layer of post-consumer carpet matrix (PCC matrix)
4 Plants
5 Top covering
6 Bottom covering
7 Post-consumer carpet fibers
8 Bonding particles
9 Pore space
10 Upper scrim roll
11 Scrim for top cover
12 Bottom scrim roll
13 Scrim for bottom cover
14 Fiber feeder
15 Foam sprayer
16 Foam resin droplets
17 Compression table
18 Upper conveyor belt
19 Lower conveyor belt
20 Upper vacuum draw
21 Lower vacuum draw
22 Mechanical cutter
23 Fusion weld
24 Internal rope, webbing or cable
25 Perimeter rope, webbing or cable
26 End cap
27 Polyurethane foam adhesive
28 Layer attachment loops
29 Float
30 Vertical curtain
31 Tether cable
32 Positively-buoyant module
33 Negatively-buoyant module
34 Attachment loop
35 Attachment strap

DETAILED DESCRIPTION OF INVENTION

The polyester (a/k/a polyethylene terephthalate, PET, or PETE) fibers currently used to manufacture matrix for FII's floating island modules are obtained from recycled beverage bottles (e.g., bottled water and soft drinks), as these have historically been the lowest-cost source of PET material. In order to produce acceptable fiber material from scrap beverage bottles, the bottles are sorted, chopped, melted, and extruded. The cost of labor, machinery and energy to convert scrap bottles into fibers is therefore significant. Conversely, scrap polymer carpet may be converted to fibers by merely pulling the material apart, removing the fraction of fibers comprised of nylon (which is more valuable than the other carpet components), and cleaning the remaining fibers to remove dirt and additives.

The fibers comprising the recycled carpet material (after the nylon has been removed) are polypropylene and polyester. There are no energy-intensive melting processes required to extract these fibers from the scrap carpet. Due to the energy savings achieved in the production of fibers from scrap carpet as compared to the production of fibers from recycled beverage bottles, the market price for recycled carpet scrap fibers (a/k/a post-consumer carpet, or PCC) is approximately one-fourth the cost of recycled PET-bottle fiber. By manufacturing floating islands from PCC rather than recycled PET bottles, the unit cost of islands is significantly reduced. In addition to the cost savings, the PCC fiber material has been shown to be more pH-stable than PET-bottle fibers during certain microbial processes, and this characteristic makes the PCC fibers superior for water treatment in some applications such as microbial nitrification of ammonia-contaminated wastewater, in which a reduction of pH is detrimental to the process. Calcium carbonate is typically used as a binder additive during the manufacture of new carpeting, and this compound, which is retained as a coating on a portion of the PCC fibers, is at least partially responsible for the pH stability (a/k/a "buffering capacity") of matrix made from PCC fibers.

Because polymer fibers are typically not round in cross section, the "thickness" of these fibers is typically not expressed in terms of diameter but is instead expressed in units of denier, which is a measure of the mass-to-length ratio of the fiber. Nonwoven matrix manufactured from PET bottles may utilize a wide range of deniers because the fibers may be extruded to any desired denier value within practical limits. In general, matrix made from relatively coarse PET fibers (100 to 200 denier range) will have greater tensile strength and permeability but less internal surface area than matrix made from relatively fine PET fibers (e.g., 6 to 50 denier range). Matrix made from PCC will comprise fibers only in the denier range that was originally present in the carpet, which is typically predominantly in the range of about 20 to 50 denier, with a small percentage of fibers up to 100 denier. For this reason, matrix made from relatively fine PCC fibers may be well suited for applications that require a large microbial growth surface area (e.g., wastewater treatment) but not well suited for applications that require high tensile strength (e.g., wave attenuation in severe-storm environments). In other words, the present invention is expected to be superior to the prior-art, PET-bottle based matrix for some, but not all, floating island applications.

The present invention is a floating island module comprised of one or more layers of nonwoven polymer matrix that are in turn comprised of PCC fibers that are bonded together with a rapid-curing, two-part adhesive and sandwiched between two layers of permeable, abrasion-resistant coverings. A floating island module may be deployed as an individual unit in some applications. Alternately, multiple modules may be joined to create a single, larger floating island for other applications. For example, for waterway aesthetics applications, a single module having a top surface area of 50 square feet might be appropriate to grow decorative plants, while a wastewater lagoon may require an array of 100 connected modules having a combined top surface area of 5000 square feet in order to achieve the desired cleanup capacity.

Figure 6:
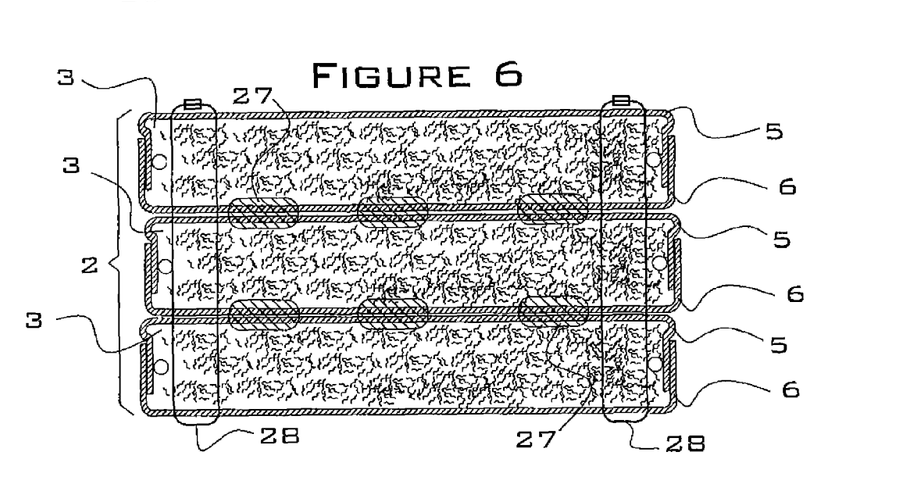
FIG. 6 is a cross-section front view of a module comprising three layers of PCC matrix that have been vertically stacked and attached using polyurethane foam adhesive.

In a preferred embodiment, the PCC matrix is manufactured in a continuous roll, which is cut to desired lengths in a following manufacturing step. Internal webbing straps or cables may optionally be set into the material during the manufacturing process. The continuous roll of matrix material may be made any desired width and may be cut to any desired length. Where larger sizes of matrix are desirable, practical dimensions of approximately 7 feet wide by 50 feet long may be useful for efficient packing into semi-trailers for transportation. Thickness of the matrix is limited by practical aspects of the manufacturing process and ranges from about one inch to about eight inches using the currently developed manufacturing process. The matrix layers may be stacked and bonded to produce multiple-layer modules of any desired thickness. Layer bonding may be accomplished by either chemical adhesives or mechanical fasteners. Suitable bonding adhesives include thermoplastic polymer (hot-melt glue) and polyurethane expanding foam. The expanding foam is preferable where maximum bonding strength is required because it penetrates into the fibers of adjoining layers. The layers of matrix may alternately be joined with mechanical fasteners, such as loops made of polymer or metal that pass through multiple layers of matrix, as shown in FIG. 6.

Nonwoven PET-bottle matrix that is currently produced commercially is naturally non-buoyant because the fibers have a specific gravity greater than 1.0 and because the adhesive binder materials incorporated into the matrix are also non-buoyant. In order to provide sufficient buoyancy to floating structures made from PET-bottle matrix, supplemental buoyancy must be provided by the inclusion of floats, expandable foam, or other buoyant materials. Conversely, the buoyancy of the present invention is provided in the form of relatively small, buoyant droplets that are applied to the interior of the structure during the manufacturing process, as explained more fully below.

Figure 1:
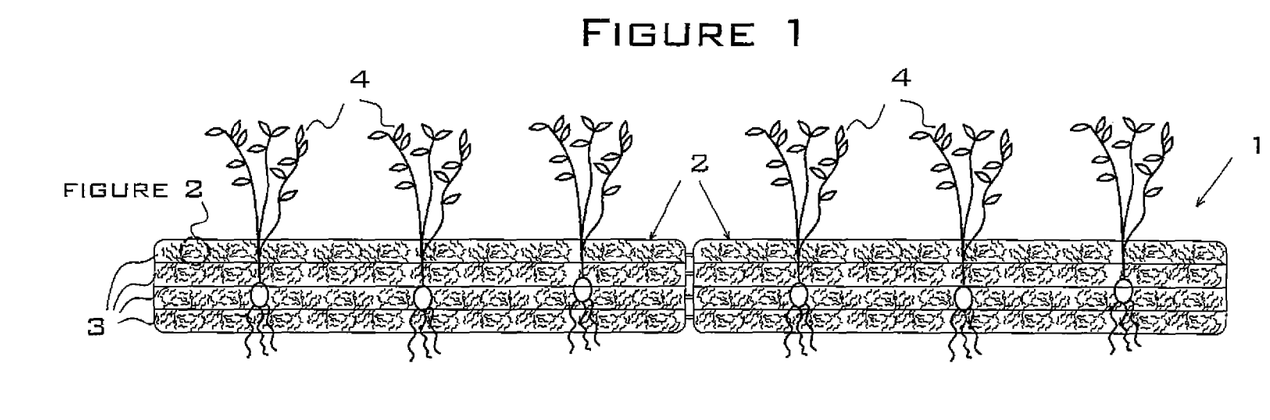
FIG. 1 is a cross-section side view of a first embodiment of the present invention.

FIG. 1 is a cross-section side view of a first embodiment of the present invention. In this embodiment, the floating island 1 is comprised of two connected modules 2 that are each comprised of four stacked layers of permeable and porous PCC matrix 3. The present invention is not limited to any particular number of modules. Also shown are optional plants 4 growing through the layers of PCC matrix 3. In any natural environment, the surfaces of the internal fibers and the surfaces of the outer coverings will be colonized by microbes, insects, algae, and other aquatic life forms (not shown). Although the example island shown in the figure is comprised of four layers of PCC matrix 3, the number of layers may practically vary from one to ten or more, depending on the specific application for the product.

Figure 2:
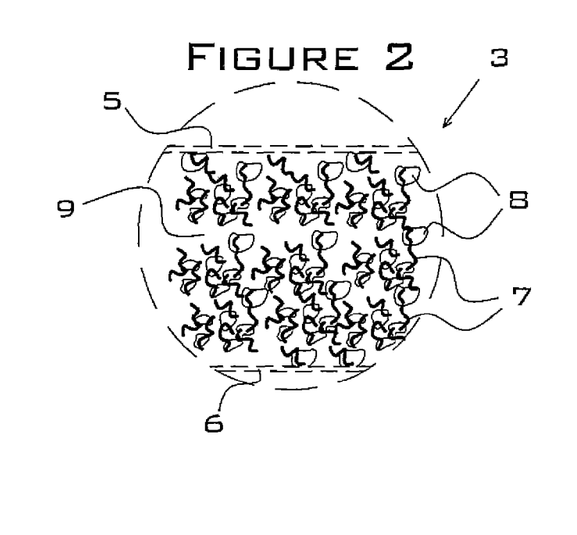
FIG. 2 is a magnified cross-section side view of a portion of one layer of the PCC matrix.

FIG. 2 is a magnified cross-section side view of a portion of one layer of the PCC matrix 3. Shown are the top covering 5, bottom covering 6, PCC fibers 7, bonding particles 8 and pore spaces 9. The top covering 5 and bottom covering 6 are made of materials that are resistant to abrasion and ultraviolet (UV) light, permeable to water and gasses, and optionally penetrable by plant roots and stems. The purpose of the top covering 5 and the bottom covering 6 is to protect the PCC fibers 7 and the bonding particles 8 from damage due to wildlife, boats, sunlight, wind, waves, and other external stresses, thereby adding durability. The top covering 5 and the bottom covering 6 may alternately be fabricated from open-weave polypropylene carpet backing fabric (a/lda scrim) or nonwoven polymer geotextile fabric. Although multiple layers may be stacked, each layer will have its own top and bottom covering. In embodiments with multiple layers, no additional coverings are required.

The bonding particles 8 are used to attach the PCC fibers 7 together and also to attach the PCC fibers 7 to the top covering 5 and bottom covering 6. The particular material comprising the bonding particles 8 is preferably selected depending on the particular application for which a specific floating island is designed and the buoyancy required. For example, some waterscape-beautification applications require a floating island to support relatively tall and heavy plants such as bulrushes and willows. In order to support the weight of the plants and keep the floating island afloat during high wave events, the floating island requires relatively high reserve buoyancy.

To obtain this level of buoyancy, the material comprising the bonding particles 8 is preferably comprised of closed-cell polymer foam such as two-part polyurethane foam having a cured density of about 2.0 to 8.0 pounds per cubic foot, and the volume of foam used is calculated based on the amount of reserve buoyancy required. In a first example, if a floating island is 12 inches thick and is required to support a top load of 20 pounds per square foot with a freeboard of 6 inches, then the matrix should contain approximately 68% foam bonding particles by volume, assuming the bonding particles have a cured density of about 4.0 pounds per cubic foot. In a second example, if a floating island is 12 inches thick and is required to support a top load of 5 pounds with a freeboard of 3 inches, then the matrix should contain approximately 11% foam bonding particles by volume, again assuming the bonding particles have a cured density of about 4.0 pounds per cubic foot.

The pore spaces 9 serve several purposes. First, they provide a volume for the bonding particles 8 to occupy. This is particularly useful when expanding polymer foam is used as the bonding agent because the foam will expand into some of the air-filled pore spaces during the manufacturing process. After deployment, the remaining non-filled pore spaces provide porosity and permeability to the matrix, thereby allowing contaminated water to move freely through the matrix, where it is treated by microbial biofilms that colonize the fibers of the matrix. Additionally, the pore spaces allow the roots and stems of plants to easily penetrate the matrix. Finally, the pore spaces reduce the weight of the matrix for transport.

Figure 3:
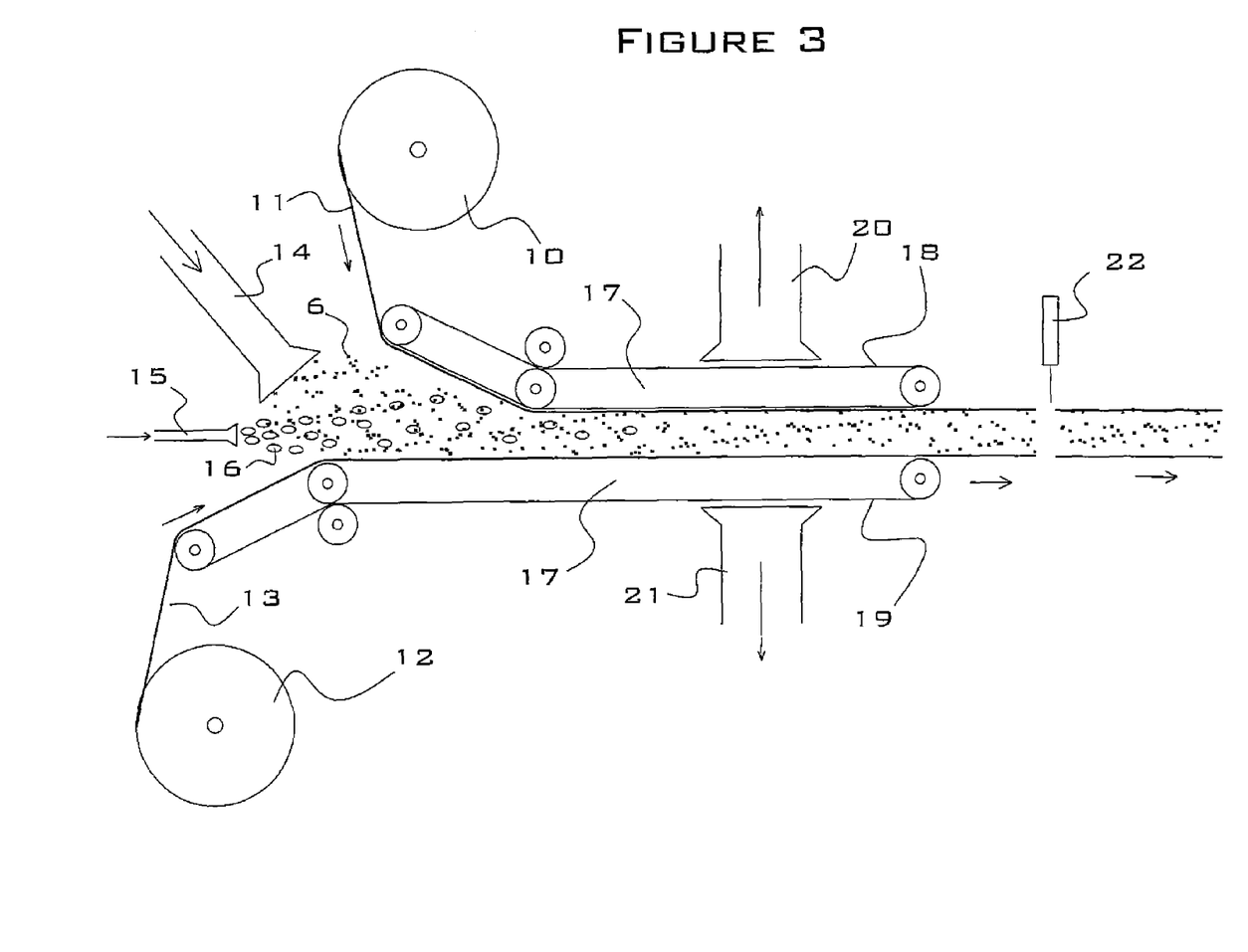
FIG. 3 is a schematic depiction of a preferred manufacturing process of the present invention.

FIG. 3 is a schematic depiction of a preferred manufacturing process of the present invention. As shown in the figure, PCC matrix material is formed in a continuous linear process (with directional arrows showing the movements of the various components). An upper scrim roll 10 supplies top-cover scrim 11, and a lower scrim roll 12 supplies bottom-cover scrim 13. As used herein, the term "scrim" means a loosely woven, durable cloth made from polymer or natural fiber. A fiber feeder 14 blows loose PCC fibers 6 between the top-cover scrim 11 and the bottom-cover scrim 13, while a foam sprayer 15 simultaneously sprays uncured two-part polyurethane foam resin droplets 16 onto the loose PCC fibers 6. The loose PCC fibers 6 are then compressed to the desired packing density as they travel along the compression table 17, with movement provided by an upper conveyor belt 18 and a lower conveyor belt 19.

As the matrix passes between an upper vacuum draw 20 and a lower vacuum draw 21, a first portion of the uncured two-part polyurethane foam resin droplets 16 is pulled toward and against the inside surface of the top-cover scrim 11 by the upper vacuum draw 20, while a second portion of the uncured two-part polyurethane foam resin droplets 16 is pulled toward and against the bottom-cover scrim 13 by the lower vacuum draw 21. The droplets 16 then cure in place, thereby forming bonding particles 7, which bond a portion of the PCC fibers 6 to the interior surfaces of the top covering 4 and the bottom covering 5, as shown in FIG. 2. As the bonded fiber with top and bottom covers travels past the compression table 17, it is cut into desired lengths by mechanical cutter 22, and then the sides and edges are sealed, as explained in conjunction with FIGS. 4 and 5. Each sealed unit represents one layer of PCC matrix 3 as shown in FIG. 1.

Figure 4:
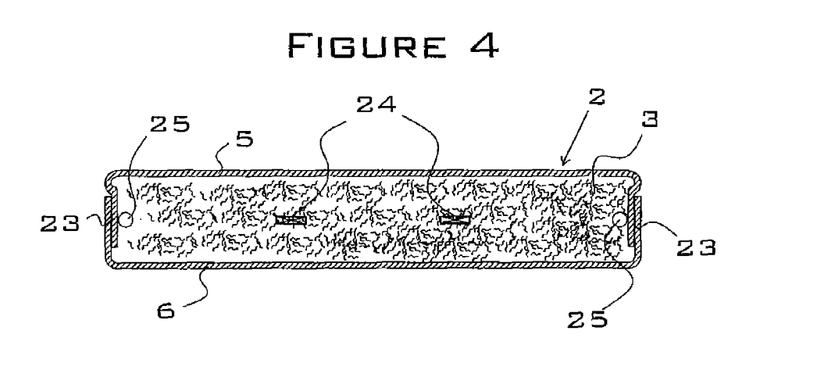
FIG. 4 is a cross-section front view of a layer of PCC matrix that illustrates the side edge sealing technique of the present invention.

FIG. 4 is a cross-section front view of a layer of PCC matrix 3 that illustrates the side edge sealing technique. As shown in the figure, the left and right edges of bottom covering 6 are wrapped outside of the left and right edges of top covering 5, and then the overlapping seams of the left and right edges are sealed with fusion welds 23. (The sides of the scrim, referred to in the preceding sentence as the left and right edges of the top covering 5, are folded over for a fusion weld. As described below, the ends of the scrim, referred to below as the front and rear edges, are covered with end caps. There would typically not be an excess scrim material on the front and rear edges because the front and back end of each piece of scrim is vertically cut so that the length of the scrim roughly equals the length of the matrix.) Also shown is optional internal rope, webbing or cable 24 and optional perimeter rope, webbing or cable 25, either or both of which may be incorporated into the module for additional strength. The internal rope, webbing or cable may optionally be installed during the continuous manufacturing process, and the perimeter rope, webbing or cable may optionally be installed around each piece of matrix after the continuous roll of matrix material has been cut into individual pieces and before the edges are sealed.

Figure 5:
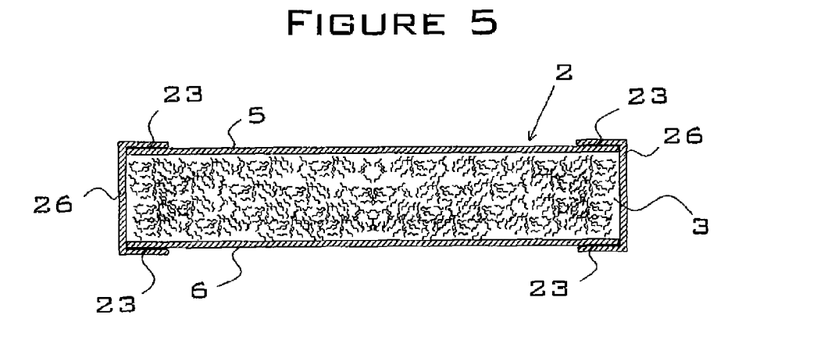
FIG. 5 is a cross-section side view of one layer of PCC matrix that illustrates the end sealing technique of the present invention.

FIG. 5 is a cross-section side view of one layer of PCC matrix 3 that illustrates the end sealing technique. As shown in the figure, end caps 26 are placed over the front and rear edges of top cover 5 and bottom cover 6, and the end caps 26 are sealed in place with fusion welds 23. End caps 26 are preferably made of scrim material similar to the material comprising top cover 4 and bottom cover 5. End caps are placed on the ends of each layer of matrix with top and bottom covering; as noted above, a floating island module 2 may comprise one or more layers of matrix 3.

The assembled layer may optionally be vertically or horizontally punched with slits or holes (not shown) in order to increase permeability of the layer and/or to provide planting pockets for seeds and bedding plants along the top and sides of the layer.

FIG. 6 is a cross-section front view of a module 2 comprising three layers of PCC matrix 3, which have been vertically stacked and attached using polyurethane foam adhesive 27. The polyurethane foam adhesive 27 is preferably a two-part product that is applied to the top of a first layer of PCC matrix 3, after which a second layer of FCC matrix 3 is immediately set on top of first layer of PCC matrix 3 so that the polyurethane foam adhesive penetrates into both of the adjoining layers of PCC matrix 3, where it expands and cures in place. The polyurethane foam adhesive 27 is applied as multiple discrete shots so that it cures as discrete nodules of closed cell foam, thereby retaining the ability of the module 2 to be permeable to water and gasses. Also shown are layer attachment loops 28, which may be used as an alternative to or in addition to foam adhesive 27 to bond the layers 3 together. The layer attachment loops are punched through the layers. The layer attachment loops 28 are preferably comprised of polymer rope or webbing, or metal strapping or cables.

In a first alternative embodiment of the manufacturing process (not shown), the two-part polyurethane foam resin droplets 14 shown in FIG. 3 are replaced with two-part polyurethane or polyurea (non-foaming) resin droplets that cure in place to bond the fibers without producing foam. In a second alternative embodiment of the manufacturing process (not shown), the two-part polyurethane foam resin droplets 14 shown in FIG. 3 are replaced with molten droplets of thermoplastic polymer (such as polypropylene) resin that cure in place to bond the fibers without producing foam. These two alternative embodiments would be utilized for applications requiring less buoyancy and/or more tensile strength for the floating island modules.

In a third alternative embodiment of the manufacturing process, the PCC fibers are compressed into a nonwoven blanket with no adhesive binder additives. The manufacturing process includes placement of a scrim top cover and a scrim bottom cover and optional internal webbing and optional perimeter ropes, as described previously in association with FIGS. 3 and 4. This embodiment may be suitable for applications requiring minimal tensile strength for the matrix and the lowest possible manufacturing cost.

In a fourth alternative embodiment of the manufacturing process, jute or coir fibers are used in place of the PCC fibers to manufacture a natural-fiber matrix, using the manufacturing process described in association with FIGS. 3 and 4. In a fifth alternative embodiment of the manufacturing process, pre-made jute or coir blankets are covered with top and bottom scrim (i.e., top and bottom covering) to provide a natural-fiber matrix. In this embodiment, the top and bottom scrim covers are attached to the jute or coir blankets by spraying an uncured adhesive onto the surface of the jute or coir blanket, and then immediately applying the scrim covering over the jute or coir blanket, so that the adhesive contacts both the blanket surface and the scrim surface, penetrates into both the blanket and scrim material, then cures in place, thereby adhering the blanket and scrim coverings together. The adhesive may be comprised of two-part polyurethane, polyurethane foam, thermoplastic resin, or thermoplastic resin foam. One example of a premade coir blanket is the product produced by ExcelHigh Corporation, Inc. of Siri Lanka with U.S. offices located in New York, N.Y.

In an alternative embodiment of a module comprised of multiple stacked layers of matrix, a combination of PET-bottle matrix layers and PCC matrix layers may be stacked to form a composite module. For example, a three-layer module may be comprised of a bottom layer of PET-bottle matrix, a center layer of PCC matrix, and a top layer of PET-bottle matrix. This type of composite floating island may combine the advantages of low cost and optimal nutrient removal provided by the PCC matrix with the tensile strength of the PET-bottle matrix for application requiring a combination of characteristics.

PCC matrix may be manufactured so as to be positively buoyant, neutrally buoyant, or negatively buoyant, depending on the expected application for the product. Positively buoyant matrix may be produced by using foam resin droplets to bond the PCC fibers during the manufacturing process. Neutrally buoyant matrix may be produced by using non-foam resin droplets to bind the PCC fibers during the manufacturing process. Negatively buoyant matrix may be made by using non-foam resin droplets to bind the PCC fibers, and adding sand or gravel particles to the PCC fibers during the manufacturing process. Positively buoyant modules, as previously described, are typically desirable for decorative and conventional water treatment islands. Neutrally buoyant modules are desirable for applications in which the floor of a floating stream channel is required to be below pond waterline. Negatively buoyant modules are desirable for applications such as sinkable sheets of material that can be dropped on top of submerged weed beds to block sunlight and thereby inhibit weed growth.

The water permeability of PCC matrix and PET-bottle matrix can be manipulated by varying the packing density of the fibers within the matrix. For example, PCC matrix that contains six pounds of fibers per cubic foot of matrix will have less permeability than matrix containing three pounds of fibers per cubic foot. Water permeability of PCC-matrix and PET-bottle matrix is also a function of the fiber denier. For example, a matrix comprised of small-denier fibers will typically have a low permeability compared to a similar-density matrix comprised of large-denier fibers because the small fibers result in a matrix having smaller pore spaces and a more tortuous flow path for water traveling through the matrix.

Matrix with relatively low water permeability is desirable for some applications. For example, for floating treatment streambeds, a portion of the flowing water flows laterally through the stream channel and is returned to the water body at the terminal end of the channel, while another portion of the flowing water percolates through the floor of the stream channel, where it is treated by biofilms growing within the streambed matrix, and then reenters the water body beneath the stream channel. For this application, it is desirable for the streambed to have relatively low water permeability so that a portion of the water is retained on top of the streambed. PCC-fiber matrix is preferable to PET-bottle matrix for applications requiring low permeability because the relatively fine-denier fibers of the PCC matrix can be easily manufactured into a low-permeability matrix.

Figure 7:
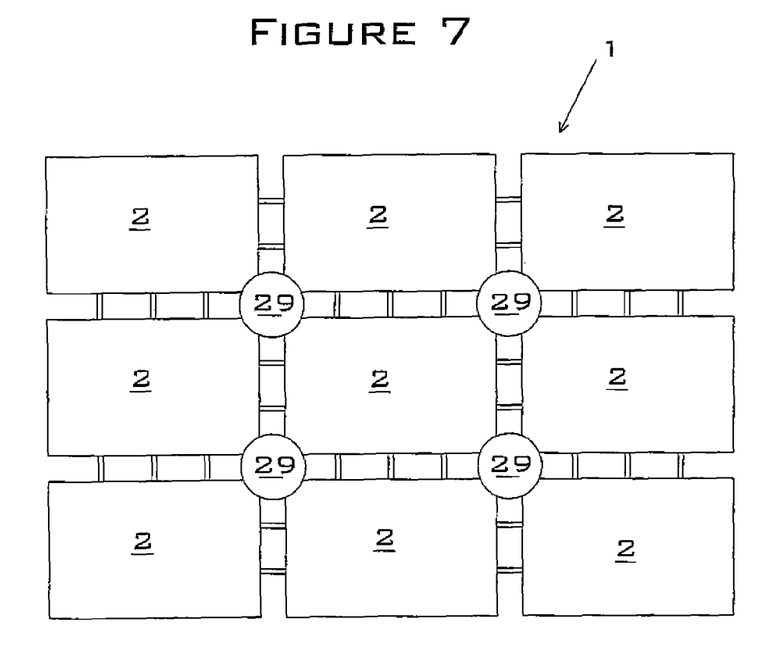
FIG. 7 is a top view of a floating island comprised of a plurality of modules with floats to provide additional buoyancy.
Figure 8:
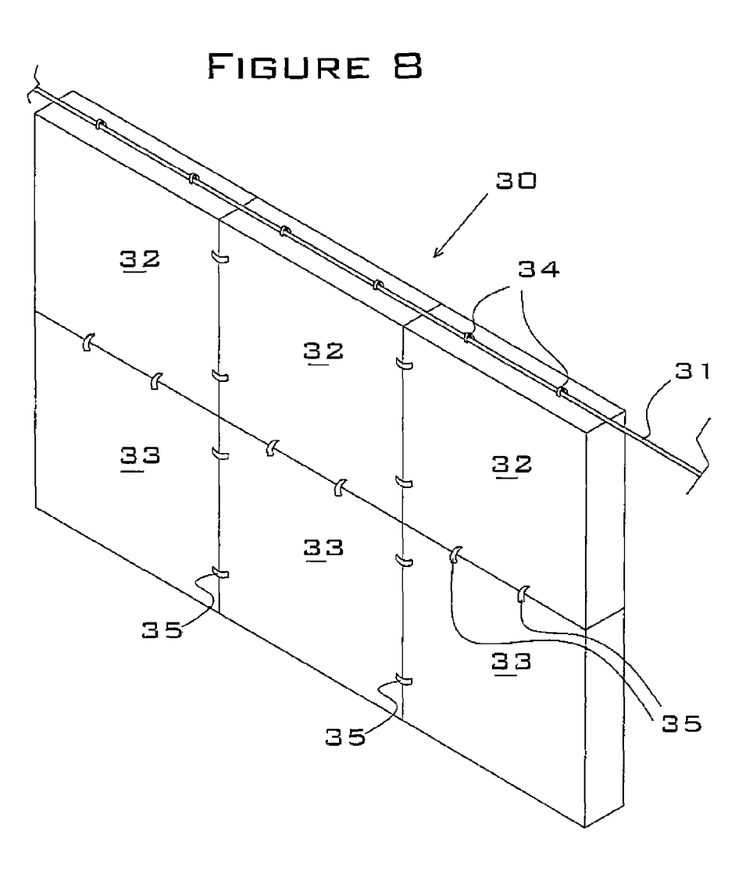
FIG. 8 is a perspective view of the vertical curtain embodiment of the present invention.

FIG. 7 is a top view of a floating island 1 comprised of nine modules 2 similar to the modules shown in FIG. 1. This embodiment also comprises optional floats 29, which provide additional buoyancy to the floating island 1. The floats 29 may be made from a variety of materials, including polyurethane foam or polystyrene. The floats 29 may also be comprised of hollow shells made of polyethylene or polypropylene, and filled with air or polymer foam. The floats 29 may be attached to the modules 2 by cables or webbing that pass through the modules 2 (not shown). The floats 29 allow the modules 2 to be constructed using a minimum of buoyant foam droplets, thereby reducing manufacturing costs and increasing permeability of the modules 2. In an alternative embodiment shown in FIG. 8, PCC matrix modules may be installed vertically into the water to form a vertical curtain 30. Single modules or multiple joined modules may be used for this embodiment. The vertical curtain 30 may be used to direct water flow (in order to produce desired circulation profiles around a water body). The vertical curtains may also be used to grow biofilms that improve water quality. The vertical curtain 30 may be positioned by means of an attached tether cable 31 that is secured to floating buoys, docks, or shoreline anchors (not shown). The vertical curtain 30 shown in FIG. 8 is comprised of two rows of modules, consisting of an upper row of positively-buoyant modules 32 and a lower row of negatively-buoyant modules 33. This type of configuration would tend to be more stable than a vertical curtain comprised of multiple identical modules because the negatively-buoyant modules 33 would tend to sink and maintain the vertical orientation of the vertical curtain 30.

Although the vertical curtain 30 in FIG. 8 is shown to comprise two rows of three modules each for illustrative purposes, in practice, a vertical curtain could contain any number of modules in each row and any number of vertically stacked rows. The upper row of modules is connected to the tether cable 31 by attachment loops 34, which are formed of metal cable or polymer webbing. Individual modules are attached to adjoining modules by means of attachment straps 35, which are preferably comprised of polymer webbing, polymer rope, or metal cable.

The advantages of the present invention are summarized below. First, compared to PET-bottle matrix, PCC matrix is comprised of cheaper fibers, resulting in a lower-cost finished product. Second, the buoyancy of PCC matrix may be adjusted for a particular design during the manufacturing process by varying the relative volume of foam resin droplets, or alternately, by using non-foaming resin droplets in place of foam resin droplets (with the optional addition of sand and gravel particles for extra weight). Currently available PET-bottle matrix has fixed negative buoyancy that must be adjusted in a second foam-injection step. For example, to increase the buoyancy of PCC matrix that comprises polyurethane foam particles for buoyancy and fiber bonding, the volume of polyurethane resin that is sprayed into a unit volume of the fibers could be increased.

Figure 9:
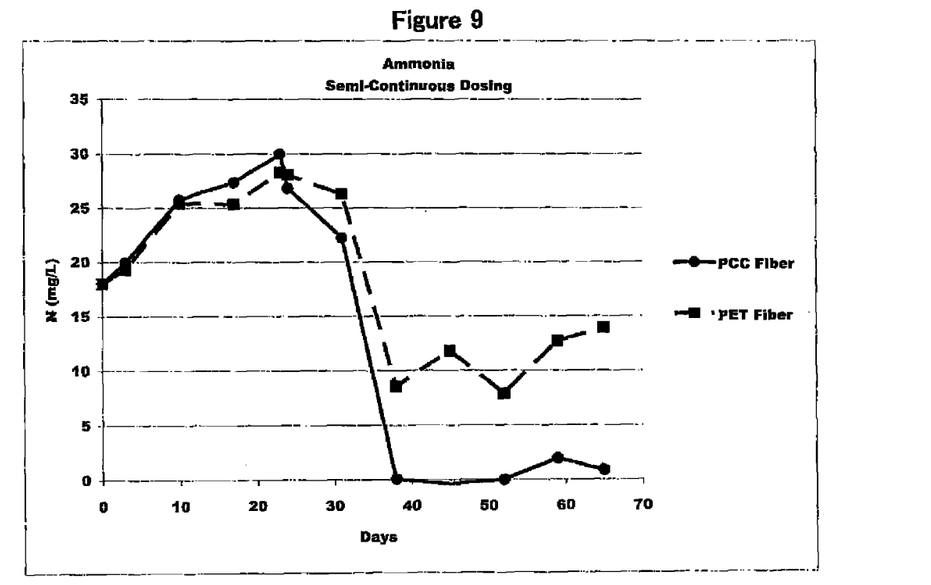
FIG. 9 is a table showing the steady-state residual ammonia concentrations for a sample of PCC fibers and a sample of PET fibers in a simulated wastewater treatment experiment.
Figure 10:
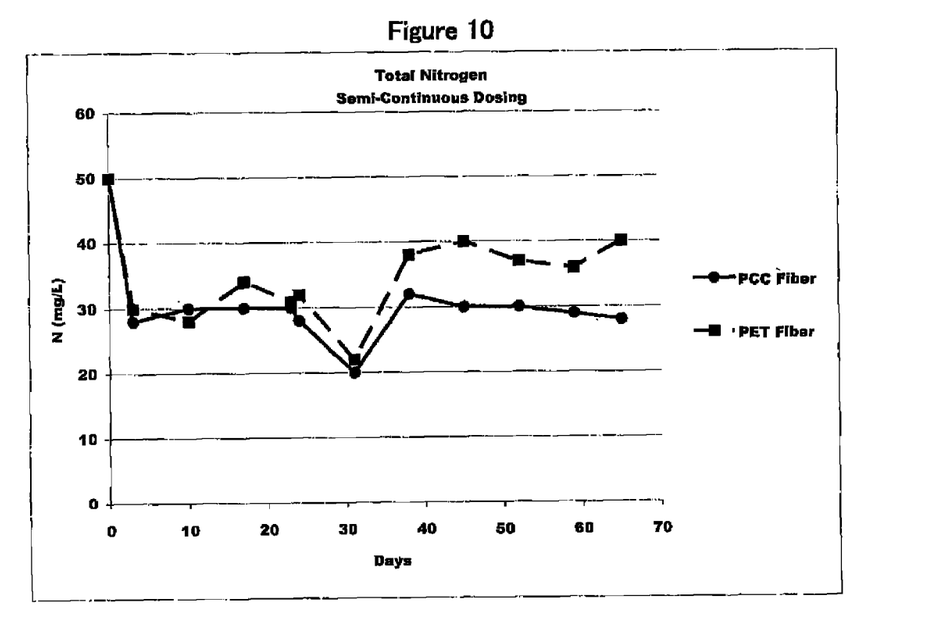
FIG. 10 is a table showing the steady-state residual nitrogen concentrations for a sample of PCC fibers and a sample of PET fibers in a simulated wastewater treatment experiment.

Third, nutrient removal rates for ammonia and total nitrogen have been shown to be higher for PCC fibers than for PET fibers, for equal-volume samples of commercially available materials and under controlled laboratory conditions. For the tests described in conjunction with FIGS. 9-11, the PET fiber sample was comprised of FUSION FLO™ matrix made from recycled PET bottles and manufactured by Americo Manufacturing Company, Inc. of Acworth, Ga., and the PCC fiber sample was comprised of recycled carpet fibers processed by Bro-Tex, Inc. of St. Paul, Minn. The PCC fibers were enclosed in a nylon net bag with no bonding particles added. FIGS. 9 and 10 show residual concentrations of ammonia and total nitrogen for semi-continuous dosed experimental runs of simulated wastewater treated by biofilms growing on the PCC and PET fibers.

FIG. 9 shows that steady-state residual ammonia concentrations were around 0 to 2 mg/L for a sample of the PCC fibers and around 8 to 14 mg/L for a similar sample of PET fibers. These data indicate that the ammonia removal rate for the PCC fibers was greater than the removal rate for the PET fibers. FIG. 10 shows that the steady-state residual values for total nitrogen were around 28 to 32 mg/L for the PCC fibers and 36 to 40 mg/L for the PET fibers, indicating that the PCC fibers showed a greater removal rate for total nitrogen than the PET fibers.

Fourth, relatively high pH buffering capacity of floating islands is desirable for some applications. For example, in wastewater treatment, the microbial denitrifying process (which converts ammonia to nitrate) naturally causes a decrease in pH. If the pH drops below about 5.0, the microbial processes will slow and may even shut down. It is beneficial, therefore, for a floating island to resist reductions in pH values when used for denitrification applications. The resistance to a decrease in pH in the presence of acid can be measured as pH buffering capacity.

Figure 11:
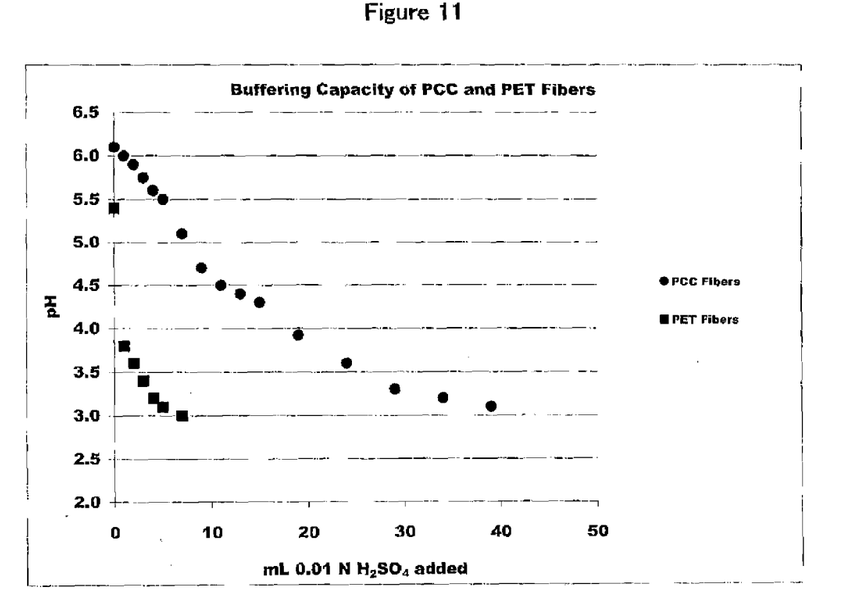
FIG. 11 is a table showing the relative buffering capacity of PCC and PET fibers.

The pH-buffering capacity of PCC fibers with biofilm was shown to be greater than that for PET-bottle fibers with biofilm. Referring to FIG. 11, the biofilm-coated sample of PCC fibers required 40 ml of acid addition to have a resulting pH of 3.0, while the PET-bottle fibers required only 7 ml of acid to produce a pH of 3.0. These data indicate that PCC-fiber floating islands may outperform PET-fiber floating islands in applications for which pH buffering is desirable.

Fifth, modules made from PCC matrix are less abrasive than modules made from PET-bottle matrix, due primarily to the finer fiber denier of the former. These less-abrasive PCC modules are more suitable for applications such as fish spawning platforms, in which abrasive materials may be unattractive to spawning fish and detrimental to eggs.

Although the preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

We claim:

1. A floating island comprising one or more modules each comprised of one or more layers of permeable and porous matrix comprised of post-consumer carpet fibers and further comprising a top covering and a bottom covering around each layer, wherein the top covering and bottom covering are each comprised of materials that are resistant to abrasion and ultraviolet light and permeable to water and gasses, wherein each module has a perimeter, and wherein the top covering and bottom covering are fusion welded together around all or a portion of the perimeter of each layer.

2. A floating island comprising one or more modules each comprised of one or more layers of permeable and porous matrix comprised of post-consumer carpet fibers and further comprising a top covering and a bottom covering around each layer, wherein the top covering and bottom covering are each comprised of materials that are resistant to abrasion and ultraviolet light and permeable to water and gasses, wherein the top covering and the bottom covering each has an outer edge, and wherein one or more end caps are placed over the outer edges of the top covering and bottom covering and fusion welded to the top covering and bottom covering.

3. A floating island comprising one or more modules each comprised of one or more layers of permeable and porous matrix comprised of post-consumer carpet fibers, wherein the layers of post-consumer carpet fiber matrix are vertically stacked and attached to each other with layer attachments loops that are punched through the layers.

4. A floating island comprising one or more modules each comprised of one or more layers of permeable and porous matrix comprised of post-consumer carpet-fiber matrix and one or more layers of polyethylene terephthalate bottle-fiber matrix, wherein the modules are arranged in rows, with one row of modules on top of another, and wherein one of the rows of modules is positively-buoyant and another row of modules is negatively-buoyant.

5. A method of manufacturing a floating island comprising one or more modules each comprised of one or more layers of permeable and porous matrix, comprising the steps of:
  (a) providing an upper scrim roll that supplies top-cover scrim to form a top covering;
  (b) providing a lower scrim roll that supplies bottom-cover scrim to form a bottom covering;
  (c) blowing loose post-consumer carpet fibers between the top-cover scrim and the bottom-cover scrim via a fiber feeder;
  (d) spraying uncured two-part polyurethane foam resin droplets onto the loose post-consumer carpet fibers as they are blown between the top-cover scrim and the bottom-cover scrim;
  (e) compressing the loose post-consumer carpet fibers to a desired packing density as they travel along a compression table to form a post-consumer carpet matrix;
  (f) passing the post-consumer carpet matrix between an upper vacuum draw and a lower vacuum draw, wherein the upper vacuum draws a first portion of the two-part polyurethane foam resin droplets toward and against an inside surface of the top-cover scrim, and the lower vacuum draw pulls a second portion of the two-part polyurethane foam resin droplets toward and against an inside surface of the bottom-cover scrim, thereby bonding the post-consumer carpet matrix to the top and bottom coverings; and (g) cutting the post-consumer carpet matrix into desired lengths with a mechanical cutter to form a layer of post-consumer carpet matrix.

6. The method of claim 5, wherein each layer of post-consumer carpet matrix has two side edges, further comprising the step of sealing the side edges by wrapping the bottom covering over the top covering to create an overlapping seam and fusion welding the overlapping seam.

7. The method of claim 5, wherein each layer of post-consumer carpet matrix has two side edges, further comprising the step of sealing the side edges by wrapping the top covering over the bottom covering to create an overlapping seam and fusion welding the overlapping seam.

8. The method of claim 5, wherein each layer of post-consumer carpet matrix has a front edge and a rear edge, further comprising the step of sealing the front and rear edges by placing an end cap over the front edge and rear edge and fusion welding the end cap to the matrix.

9. The method of claim 8, wherein the end caps are comprised of the same material as the top and bottom covering.

10. The method of claim 5, further comprising the step of punching slits or holes through the layer of post-consumer carpet matrix to increase permeability of the matrix and/or to provide planting pockets for seeds and bedding plants.

11. The method of claim 5, wherein the two-part polyurethane foam resin droplets are replaced with two-part polyurethane or polyurea non-foaming resin droplets that cure in place to bond the post-consumer carpet fibers without producing foam.

12. The method of claim 5, wherein the two-part polyurethane foam resin droplets are replaced with molten droplets of thermoplastic polymer resin that cure in place to bond the post-consumer carpet fibers without producing foam.

13. A method of manufacturing a floating island comprising one or more modules each comprised of one or more layers of permeable and porous matrix, comprising the steps of:
    (a) providing an upper scrim roll that supplies top-cover scrim to form a top covering;
    (b) providing a lower scrim roll that supplies bottom-cover scrim to form a bottom covering;
    (c) blowing loose post-consumer carpet fibers between the top-cover scrim and the bottom-cover scrim via a fiber feeder;
    (d) placing an internal rope, webbing or cable between the top-cover scrim and the bottom-cover scrim as the loose post-consumer carpet fibers are blown between the top-cover scrim and the bottom-cover scrim;
    (e) compressing the loose post-consumer carpet fibers to a desired packing density as they travel along a compression table to form a post-consumer carpet matrix; and
    (f) cutting the post-consumer carpet matrix into desired lengths with a mechanical cutter to form a layer of post-consumer carpet matrix.

14. A method of manufacturing a floating island comprising one or more modules each comprised of one or more layers of permeable and porous matrix, comprising the steps of:
    (a) providing an upper scrim roll that supplies top-cover scrim to form a top covering;
    (b) providing a lower scrim roll that supplies bottom-cover scrim to form a bottom covering;
    (c) blowing loose post-consumer carpet fibers between the top-cover scrim and the bottom-cover scrim via a fiber feeder;
    (d) compressing the loose post-consumer carpet fibers to a desired packing density as they travel along a compression table to form a post-consumer carpet matrix;
    (e) cutting the post-consumer carpet matrix into desired lengths with a mechanical cutter to form a layer of post-consumer carpet matrix; and
    (f) wherein each layer of post-consumer carpet matrix has a perimeter, securing rope, webbing or cable around all or a portion of the perimeter of each layer.

15. A method of manufacturing a floating island comprising one or more modules each comprised of one or more layers of permeable and porous matrix, comprising the steps of:
    (a) providing an upper scrim roll that supplies top-cover scrim to form a top covering;
    (b) providing a lower scrim roll that supplies bottom-cover scrim to form a bottom covering;
    (c) blowing loose jute fibers between the top-cover scrim and the bottom-cover scrim via a fiber feeder;
    (d) spraying uncured two-part polyurethane foam resin droplets onto the loose jute fibers as they are blown between the top-cover scrim and the bottom-cover scrim;
    (e) compressing the loose jute fibers to a desired packing density as they travel along a compression table to form a jute matrix;
    (f) passing the jute matrix between an upper vacuum draw and a lower vacuum draw, wherein the upper vacuum draws a first portion of the two-part polyurethane foam resin droplets toward and against an inside surface of the top-cover scrim, and the lower vacuum draw pulls a second portion of the two-part polyurethane foam resin droplets toward and against an inside surface of the bottom-cover scrim, thereby bonding the jute matrix to the top and bottom coverings; and
    (g) cutting the jute matrix into desired lengths with a mechanical cutter to form a layer of post-consumer carpet matrix.

16. A method of manufacturing a floating island comprising one or more modules each comprised of one or more layers of permeable and porous matrix, comprising the steps of:
    (a) providing an upper scrim roll that supplies top-cover scrim to form a top covering;
    (b) providing a lower scrim roll that supplies bottom-cover scrim to form a bottom covering;
    (c) blowing loose coir fibers between the top-cover scrim and the bottom-cover scrim via a fiber feeder;
    (d) spraying uncured two-part polyurethane foam resin droplets onto the loose coir fibers as they are blown between the top-cover scrim and the bottom-cover scrim;
    (e) compressing the loose coir fibers to a desired packing density as they travel along a compression table to form a coir matrix;
    (f) passing the coir matrix between an upper vacuum draw and a lower vacuum draw, wherein the upper vacuum draws a first portion of the two-part polyurethane foam resin droplets toward and against an inside surface of the top-cover scrim, and the lower vacuum draw pulls a second portion of the two-part polyurethane foam resin droplets toward and against an inside surface of the bottom-cover scrim, thereby bonding the jute matrix to the top and bottom coverings; and (g) cutting the coir matrix into desired lengths with a mechanical cutter to form a layer of post-consumer carpet matrix.

* * * * *